(12) United States Patent
Rogers

(10) Patent No.: US 8,384,344 B1
(45) Date of Patent: Feb. 26, 2013

(54) SYSTEM AND METHOD FOR CHARGING A BATTERY WITHIN A VEHICLE

(76) Inventor: David D. Rogers, Quakertown, PA (US)

( * ) Notice: Subject to any disclaimer, the term of this patent is extended or adjusted under 35 U.S.C. 154(b) by 261 days.

(21) Appl. No.: 12/858,417

(22) Filed: Aug. 17, 2010

(51) Int. Cl.
*H02J 7/14* (2006.01)
*H02J 7/00* (2006.01)
*B60K 6/20* (2007.10)

(52) U.S. Cl. ..... 320/104; 320/108; 320/109; 180/65.21; 180/65.265; 180/65.275; 180/65.28; 903/903; 903/907

(58) Field of Classification Search ............. 320/104
See application file for complete search history.

(56) References Cited

U.S. PATENT DOCUMENTS

| 5,498,948 | A |   | 3/1996  | Bruni et al. |         |
|-----------|---|---|---------|--------------|---------|
| 5,654,621 | A | * | 8/1997  | Seelig       | 320/108 |
| 5,703,461 | A |   | 12/1997 | Minoshima et al. | |
| 7,999,506 | B1| * | 8/2011  | Hollar et al.| 320/104 |
| 8,138,718 | B2| * | 3/2012  | Dower        | 320/109 |

* cited by examiner

*Primary Examiner* — Edward Tso
*Assistant Examiner* — Ahmed Omar
(74) *Attorney, Agent, or Firm* — LaMorte & Associates, P.C.

(57) ABSTRACT

A charging system and method for the batteries of a vehicle. A charging station is mounted in a fixed position where the vehicle is parked. A support extends upwardly. The support is selectively movable between a fully elevated position and a lower position. The support is biased into its fully elevated position. Two electrical contacts are mounted to the support. The electrical contacts are connected to wires that lead to an external power source. Two receiving contacts are mounted to the vehicle. The receiving contacts are positioned to automatically make direct electrical contact with the power supply contacts of the charging station as the vehicle is parked at the fixed position of the charging station.

15 Claims, 3 Drawing Sheets

SYSTEM AND METHOD FOR CHARGING A BATTERY WITHIN A VEHICLE

BACKGROUND OF THE INVENTION

1. Field of the Invention

In general, the present invention relates to charging port systems and methods that are used to charge batteries within various vehicles, such as electric cars and traditional gasoline powered vehicles. More particularly, the present invention relates to the structure of the electrical interconnection made between the vehicle and an external power source when the vehicle is in its charging bay.

2. Prior Art Description

Most all modern automobiles have batteries. In traditional gas-powered automobiles, batteries are used to start the engine and otherwise operate the electrical components of the automobile. In electric automobiles, electrical storage batteries are used to run electric motors that directly propel the automobile.

Due to the weight and relatively low storage capacity of traditional batteries, electrically powered vehicles tended to be limited to small vehicles, such as golf carts and children's toy carts. However, as batteries have improved in storage capacity and decreased in weight, several electrically powered passenger automobiles have become commercially available.

All traditional and electric vehicles that contain batteries need to have their batteries periodically recharged. Vehicles that have all electric drives typically have no way to charge their own batteries. Consequently, electric vehicle must also be connected to a charger when not in use. Traditional gas-powered automobiles recharge their batteries using an alternator that is powered by the gasoline engine. Likewise, hybrid automobiles recharge their batteries using a gasoline engine while the automobile is driving. Even if a traditional or hybrid vehicle is not running, there exists a small drain on the battery that is caused by the certain electrical components of the vehicle. If a traditional vehicle or hybrid vehicle has a weakened battery and is not driven within a period as short as a few days, then the battery may drain too low to start the vehicle. Consequently, if a traditional or hybrid vehicle is to be parked for a long period of time, it is often attached to a trickle charger that provides a small but constant charge to the vehicle's battery.

When an electric vehicle or a traditional gas-powered vehicle needs it batteries recharged, the batteries within the vehicle are connected to an external power source. This required the owner of the vehicle to find an external charger cable and manually connect the charger cable to the vehicle. This recharging process has many drawbacks. For instance, many people park their cars in small garages that do not have a lot of room. It is difficult to maneuver around a vehicle in such a setting and attach an electrical cable to the vehicle. Consequently, many vehicles do not have their batteries recharged as often as they should be. Furthermore, if an automobile is plugged into an external charger, a driver may forget about this interconnection when they enter the vehicle and begin to drive. This can cause damage to both the vehicle and the charging system as the retreating vehicle breaks the cable and/or cable connections.

To eliminate the stated problems of recharging a vehicle's battery, many recharging systems have been developed that rely upon induction charging. Induction charging systems place an induction coil in the vehicle and an induction coil at a charging port. As long as the electric vehicle is parked properly at the charging port, the induction coil in the charging port will create a charge in the induction coil in the electric vehicle. There is no mechanical interconnection between the vehicle and the charging port. In this manner, no charging cable has to be connected or disconnected. Induction coil charging systems for vehicles are exemplified by U.S. Pat. No. 5,498,948 to Bruni, entitled Self-Aligning Inductive Charger, and U.S. Pat. No. 5,703,461 to Minoshima, entitled Inductive Coupler For Electric Vehicle Charger.

Although recharging systems that use induction coils eliminate the need for a connector cable, such systems do have their own problems. The largest problem associated with the use of induction coils is the problem of charging efficiency. When using an induction coil, only a percentage of the current generated in the charging coil is induced in the receiving coil. The efficiency of the power transfer depends greatly upon the alignment of the induction coils and the distance between the induction coils. Consequently, far more energy is used to charge batteries using induction coils than is needed to charge those same batteries with a direct cable connection. Since the owners of electric vehicles tend to be conscious of power usage and power waste, charging using induction coils is not an attractive alternative to direct cable charging.

A need therefore exists for a system to charge a vehicle's battery that eliminates the need for a plug-in charging cable, yet does not use induction coils that waste energy. This need is met by the present invention as described and claimed below.

SUMMARY OF THE INVENTION

The present invention is a charging system and method for charging at least one storage battery contained within a vehicle. In accordance with the invention, a charging station is provided. The charging station has a base that is mounted in a fixed position at a location where a vehicle is typically parked. A support extends upwardly from the base. The support has a first end coupled to the base and a free second end. The second end of the support is selectively movable between a fully elevated position and a lower position. Furthermore, the second end of the support is biased into its fully elevated position.

Two power supply contacts are mounted to the second end of the support. The power supply contacts are connected to wires that lead to an external power source.

On the vehicle, two power receiving contacts are mounted. The power receiving contacts are electrically interconnected to the storage battery of the vehicle. The power receiving contacts are positioned to automatically make direct electrical contact with the power supply contacts of the charging station as the vehicle is parked at the fixed position of the charging station.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention vehicle battery charging system can be embodied to charge batteries in many types of vehicles, the embodiment illustrated shows the vehicle charging system being used to charge an electric passenger vehicle. This embodiment is selected in order to set forth the best mode contemplated for the invention. The illustrated embodiment, however, is merely exemplary and should not be considered a limitation when interpreting the scope of the appended claims.

Figure 1:
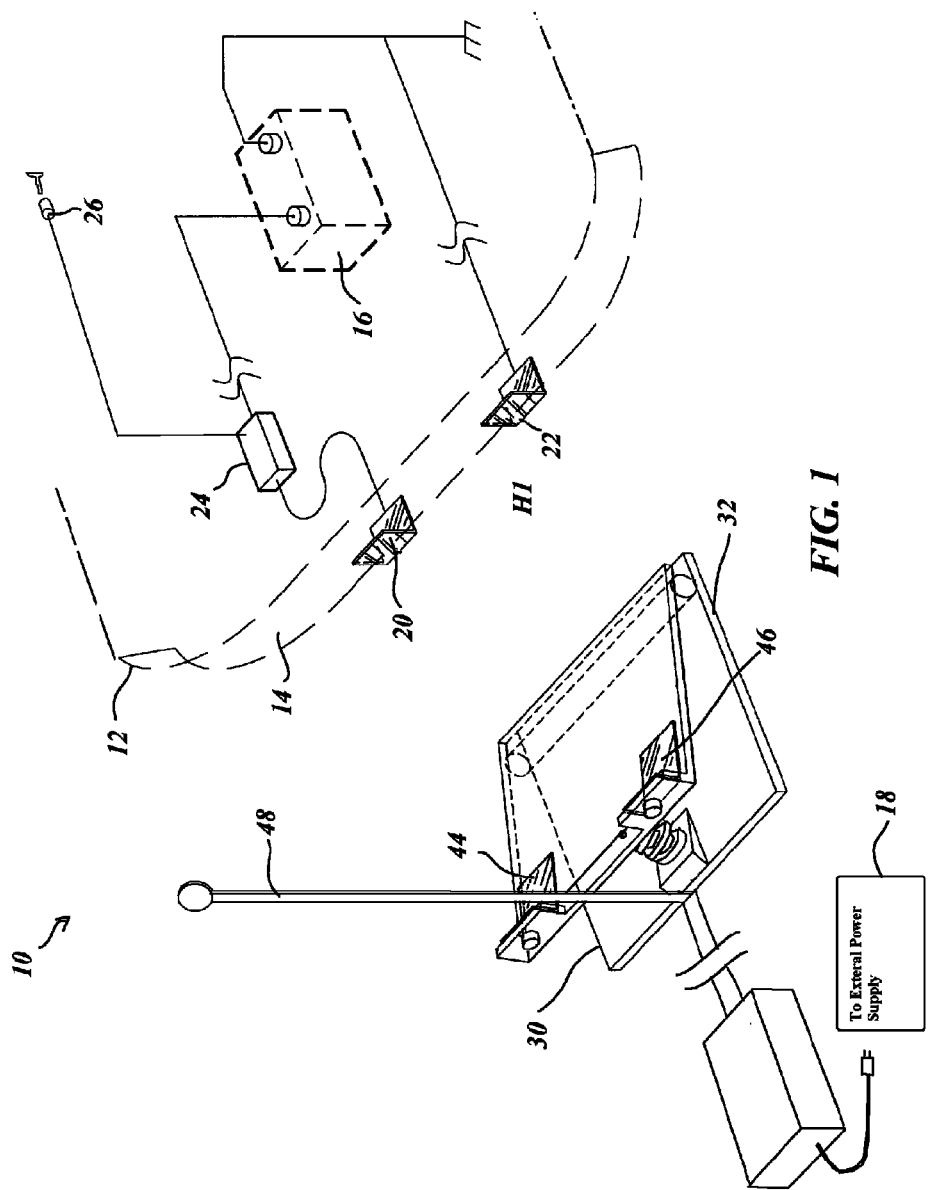
FIG. 1 is a schematic of a first exemplary embodiment of the present invention charging system.

Referring to FIG. 1, a schematic of the overall vehicle battery charging system 10 is illustrated. A vehicle 12 is shown having a front bumper 14. The shown vehicle 12 is an electric vehicle. However, it will be understood that the vehicle battery charging system 10 can also be used to charge batteries in traditional gas-powered vehicles and hybrid powered vehicles.

In FIG. 1, the vehicle 12 is an electric vehicle having storage batteries 16 that require periodic recharging from an external power source 18. The front bumper 14 is elevated a predetermined height H1 above the ground depending upon the make and model of the vehicle 12.

Two power receiving contacts 20, 22 are provided at a fixed position on the front bumper 14. The power receiving contacts 20, 22 are conductive pieces of material, such as metal or metal coated plastic. The contact surfaces are preferably a non-corrosive metal, such as stainless steel, so that the power receiving contacts 20, 22 do not rust or otherwise corrode when exposed to rain, salt and other common roadway contaminants.

The power receiving contacts 20, 22 are electrically interconnected to the electrical storage batteries 16 of the electric vehicle 12. An electronic control module 24 is provided that contains known voltage control circuitry commonly used for rechargeable batteries. The electronic control module 24 may also be coupled to the ignition 26. In this way, the electronic control module 24 only accepts a charging current when the key is out of the ignition 26. This prevents the two electrical contacts from shorting should the power receiving contacts 20, 22 inadvertently contact a conductive object, such as a trashcan or guard rail, while the vehicle 12 is in operation. Furthermore, the electronic control module 24 preferably also contains a circuit breaker or similar element that automatically opens the circuit between the storage batteries 16 and the power receiving contacts 20, 22 should the power receiving contacts 20, 22 be shorted while the vehicle 12 is not in operation.

A charging station 30 is mounted at a fixed position within a garage or at the end of a driveway. The charging station 30 is designed to automatically engage the power receiving contacts 20, 22 on the vehicle 12 and provide a charging current to the vehicle 12 when the vehicle 12 is brought to the fixed position of the charging station 30.

Figure 2:
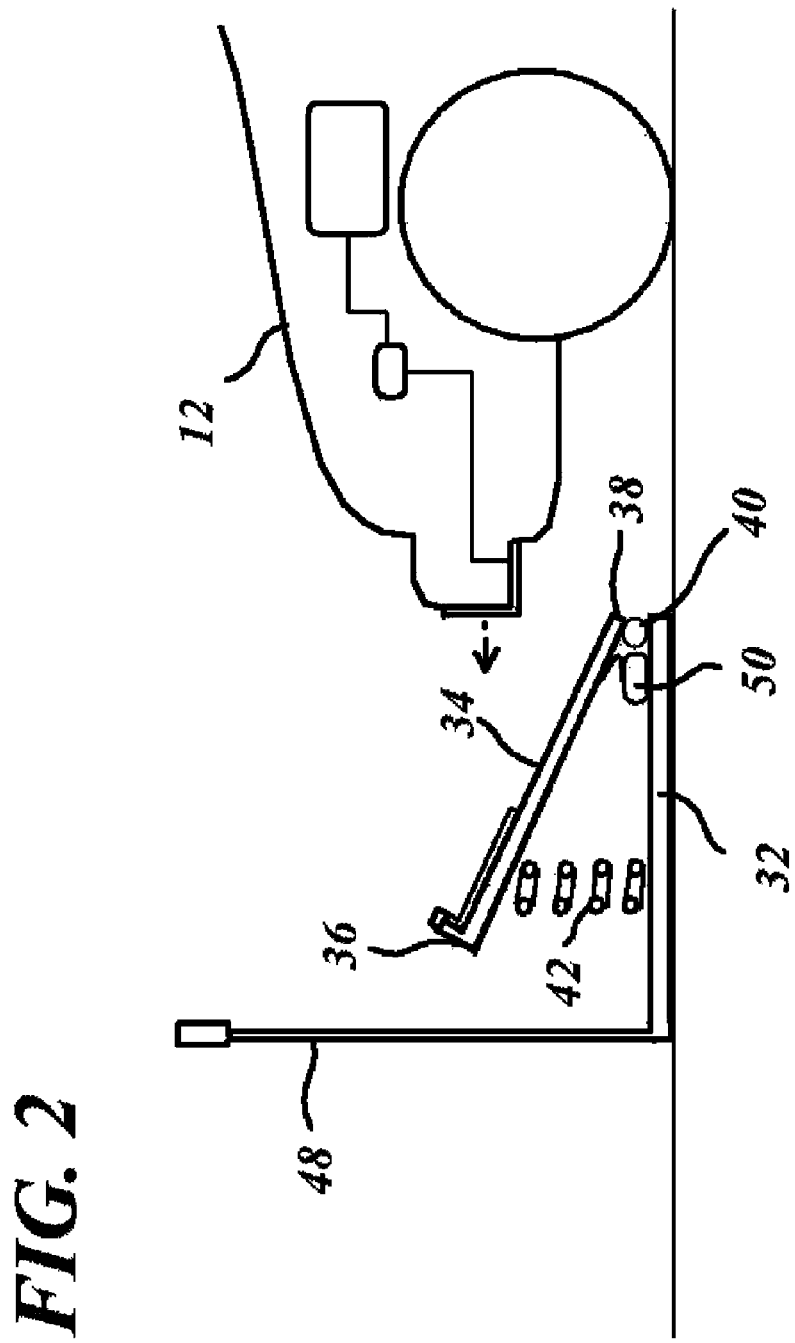
FIG. 2 is a side view of the first exemplary embodiment of the present invention charging system.

Referring to FIG. 2 in conjunction with FIG. 1, it can be seen that the charging station 30 has a base 32 that is mounted to the ground. A support platform 34 is provided. The support platform 34 has a top end 36 and a bottom end 38. The bottom end 38 of the support platform 34 is attached to the base 32 with a hinge joint 40. The support platform 34 is therefore free to rotate about the hinged joint 40. At least one spring element 42 is provided that biases the top end 36 of the support platform 34 into its most elevated position. At this biased position, the top end 30 of the support platform 24 is positioned at a height at least as high as the power receiving contacts 20, 22 on the front bumper 14 of the electric vehicle 12. The spring element 42 biases the support platform 34 upwardly with substantial force. The upward bias of the spring element 42 is preferably over twenty pounds, but should not be less than ten pounds.

Two power supply contacts 44, 46 are mounted to the support platform 34. The power supply contacts 44, 46 are wide and long. The power supply contacts 44, 46 align with the power receiving contacts 20, 22 on the bumper 14 of the vehicle 12. The width of the power supply contacts 44, 46 should enable the power receiving contacts 20, 22 to touch the electrical contact plus/minus at least ten inches of relative lateral movement between the vehicle 12 and the charging station 30. In this manner, the driver of the vehicle 12 need not precisely align the vehicle 12 with the charging station 30. Rather, the driver need only be within ten inches of the ideal alignment.

Alignment of the vehicle 12 with the charging station 30 is assisted by use of an optional position post 48. The position post 48 is a flexible element that extends upwardly from the rear center of the charging station base 32. The position post 48 extends to a height that is higher than the hood of the vehicle 12. In this manner, a person driving the vehicle 12 can see the position post 48 even when the charging station 30 cannot be seen. The driver aligns the position post 48 with the center of the hood of the vehicle 12. The driver also moves the vehicle 12 over the charging station 30 until the front bumper 14 of the vehicle 12 touches the position post 48.

The power supply contacts 44, 46 are connected to an external power source 18 that generates the power needed to recharge the storage batteries 16. The flow of electricity to the power supply contacts 44, 46 is selectively controlled by at least one activation sensor 50. The activation sensor 50 detects the presence of the vehicle 12. The activation sensor 50 preferably detects multiple parameters to ensure that the vehicle 12 is present on the charging station 30 and that accidental contact with another object, such as a fallen bicycle, has not occurred. The activation sensor 50 may include a switch that determines whether or not the support platform 34 supporting the power receiving contacts 20, 22 has been forced down against the bias of the spring element 42. As has been previously described, the support platform 34 is biased upwardly with a force of at least ten pounds and preferably with a force over twenty pounds. This force is applied by a vehicle 12 with no effort. However, such a weight threshold would prevent the charging station 30 from activating should some everyday item inadvertently fall against the charging station 30. Other sensors could detect the impedance of the circuitry within the vehicle 12 or a specific activation code generated within the circuitry of the vehicle 12.

In operation, a driver mounts the charging station 30 in a fixed position within a garage or driveway where a vehicle is normally parked. The charging station 30 is plugged into the wall or otherwise powered. As a person parks the vehicle 12, the driver aligns the center of the vehicle 12 with the position post 48. Being several inches off alignment has no adverse effect. When so parked, the power supply contacts 44, 46 on the charging station physically contact the power receiving contacts 20, 22 on the bumper 14 of the vehicle 12. Furthermore, the weight of the vehicle 12 pushes down the support platform 34 of the charging station 30 and activates the charging station 30. An electrical current is then directly transferred to the vehicle 12 to recharge the storage batteries 16.

The interconnection between the charging station 30 and the vehicle 12 is automatic. Provided the vehicle 12 is parked in a proper orientation, the storage batteries 16 within the vehicle 12 will automatically interconnect with the charging station 30 and will be charged. No cable needs to be connected to the vehicle 12. Furthermore, since there is a direct electrical interconnection between the charging station 30 and the vehicle 12, there are no power losses or other issues created by the use of induction coils.

Likewise, the vehicle 12 can be driven away from the charging station 30 without the need to disconnect anything. The disconnect between the vehicle 12 and the charging station 30 is automatic. Furthermore, the actual charging current traveling from the charging station 30 to the vehicle 12 stops the instant the driver sets the keys in the ignition of the vehicle 12.

Figure 3:
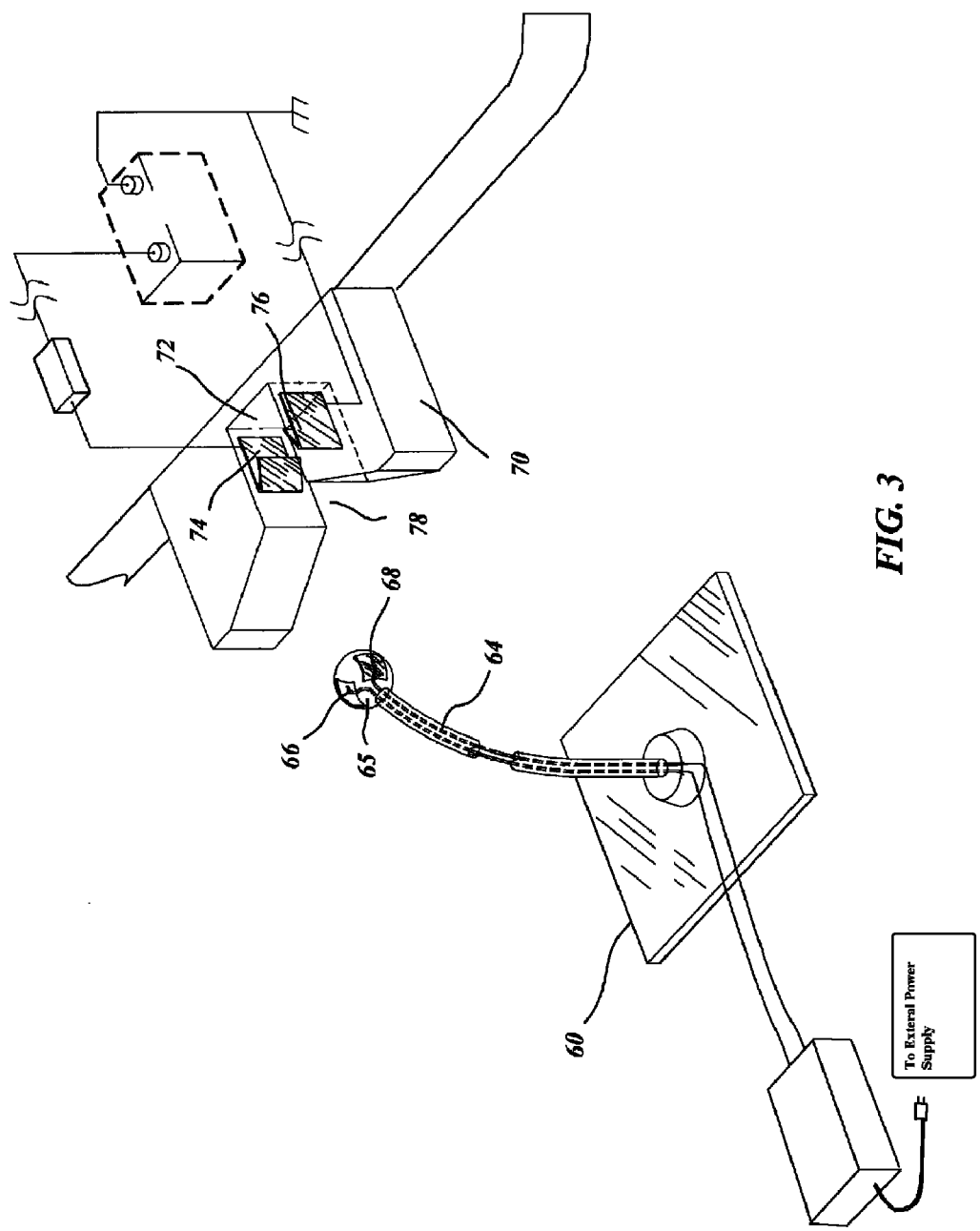
FIG. 3 is a schematic of a second exemplary embodiment of the present invention charging system.

In the embodiment of FIG. 1 and FIG. 2, there are two power supply contacts 44, 46 that need to contact the two power receiving contacts 20, 22 on the vehicle 12 in order for charging to occur. It will be understood that if the vehicle 12 approaches the charging station 30 at an angle, the needed double electrical interconnections would be difficult to achieve. Referring to FIG. 3, an alternate embodiment of the present invention is shown. In the embodiment of FIG. 3, an alternate embodiment of a charging station 60 is shown. The charging station 60 has a base 62 that is mounted in a fixed position. A flexible support 64 extends upwardly from the base 62. An enlarged head 65 is attached to the top of the flexible support 64. Two power supply contacts 66, 68 are disposed on the enlarged head 65.

As is shown in FIG. 3, the flexible support 64 is flexible, yet is rigid enough to support the enlarged head 65 at the same height as the bumper of the vehicle 12.

The two power supply contacts 66, 68 are disposed on opposite sides of the enlarged head 65. The power supply contacts 66, 68 attach to wires that lead down the flexible support 64. The wires lead to the external power source 18 that produces the charging current.

A receptacle 70 is attached to the vehicle 12. The receptacle 70 has a slot 72 that is sized to receive the enlarged head 65 of the charging station 60. Power receiving contacts 74, 76 are located within the slot 72 that electrically interconnect with the power receiving contacts 74, 76 when the enlarged head 65 is positioned within the slot 72.

The receptacle 70 has a tapered region 78 that guides the enlarged head 65 of the charging station 60 into the slot 72. The tapered region 78 is at least ten inches wide so that the enlarged head 65 will be received in the receptacle 70 even if the center of the receptacle 70 is not precisely aligned.

If a driver drives too far over the charging station 60, the enlarged head 65 will pull out of the bottom of the receptacle 70. In this manner, no harm is caused to the charging station 60 or to the vehicle.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A charging system for at least one storage battery contained within a vehicle, said charging system comprising:
   a charging station having;
   i) a base mounted in a fixed position;
   ii) a position post extending upwardly from said base to provide a visual indication of said fixed position to a driver of the vehicle;
   iii) a support having a first end coupled to said base and a free second end, wherein said second end of said support is selectively movable between a fully elevated position and a lower position, and wherein said second end of said support is biased into said fully elevated position;
   iv) two electrical contacts mounted to said second end of said support, wherein said electrical contacts are connected to wires that lead to an electrical power source;
   two receiving contacts that are electrically interconnected to the storage battery of the vehicle, said receiving contacts being positioned to automatically make direct electrical contact with said electrical contacts of said charging station as said vehicle is parked at said fixed position.

2. The system according to claim 1, wherein said second end of said support is biased into said elevated position by at least one spring.

3. The system according to claim 2, wherein said at least one spring provides an upward bias force of at least ten pounds.

4. The system according to claim 1, further including at least one sensor for detecting if said vehicle is at said fixed position.

5. The system according to claim 4, wherein said sensor detects if said second end of said support is depressed below said elevated position by said vehicle.

6. The system according to claim 1, wherein said support is flexible and said electrical contacts are disposed on an enlarged head disposed atop said support.

7. The system according to claim 6, wherein said receiving contacts are disposed within a receptacle that is shaped and sized to receive said enlarged head therein as said vehicle approaches said fixed position.

8. The system according to claim 7, wherein said receptacle includes a tapered section that guides said enlarged head toward said receiving contacts.

9. A method of charging a storage battery within a vehicle, said method comprising the steps of:
   attaching power receiving contacts to the vehicle at a predetermined position and a predetermined elevation, wherein said receiving contacts are electrically interconnected to the storage battery within said vehicle;
   providing a charging station having power supply contacts supported at said predetermined elevation by a movable support, wherein said power supply contacts are coupled to an electrical power source;
   mounting said charging station to a fixed position accessible by said vehicle;
   providing a position post that extends upwardly from said charging station to provide a visual indication of said fixed position to a driver of the vehicle;
   driving said vehicle so that said predetermined position on said vehicle is over said fixed position, wherein said power receiving contacts automatically and directly engage said power supply contacts, therein directly joining said storage battery to said electrical power source.

10. The method according to claim 9, wherein said step of providing a charging station includes providing a base to be mounted in a fixed position; and providing a movable support having a first end coupled to said base and a free second end, wherein said second end of said support is selectively movable between a fully elevated position and a lower position, and wherein said second end of said support is biased into said fully elevated position.

11. The method according to claim 10, further including the step of biasing said movable support into said elevated position by at least one spring.

12. The method according to claim 11, wherein said at least one spring provides an upward bias force of at least ten pounds.

13. The method according to claim 10, further including the step of detecting if said predetermined position of said vehicle is located above said fixed position.

14. The method according to claim 13, further including sensing if said second end of said support is depressed below said elevated position by said vehicle.

15. A charging system for at least one storage battery contained within a vehicle, said charging system comprising:
a charging station having;
   i) a base mounted in a fixed position;
   ii) at least one sensor for detecting if said vehicle is at said fixed position;
   iii) a support having a first end coupled to said base and a free second end, wherein said second end of said support is selectively movable between a fully elevated position and a lower position, and wherein said second end of said support is biased into said fully elevated position, wherein said sensor detects if said second end of said support is depressed below said elevated position by said vehicle;
   iv) two electrical contacts mounted to said second end of said support, wherein said electrical contacts are connected to wires that lead to an electrical power source;
two receiving contacts that are electrically interconnected to the storage battery of the vehicle, said receiving contacts being positioned to automatically make direct electrical contact with said electrical contacts of said charging station as said vehicle is parked at said fixed position.

* * * * *